(12) United States Patent
Fragiacomo et al.

(10) Patent No.: US 12,703,779 B2
(45) Date of Patent: Aug. 11, 2026

(54) PROCESS FOR DEPOLYMERIZING POLYETHYLENE TEREPHTHALATE (PET) BY GLYCOLYSIS WITH ETHYLENE GLYCOL, AND PLANT FOR CARRYING OUT THE SAME

(71) Applicant: Chempet S.r.l., Cerano (IT)

(72) Inventors: Guido Fragiacomo, Novara (IT); Gianluigi Noja, Novara (IT); Devis Luigi Mazzucco, Vigevano (IT); Marco Casarotti, Galliate (IT)

(73) Assignee: Chempet S.r.l., Cerano (IT)

( * ) Notice: Subject to any disclaimer, the term of this patent is extended or adjusted under 35 U.S.C. 154(b) by 706 days.

(21) Appl. No.: 17/920,449

(22) PCT Filed: Apr. 20, 2021

(86) PCT No.: PCT/IB2021/053228
§ 371 (c)(1),
(2) Date: Oct. 21, 2022

(87) PCT Pub. No.: WO2021/214642
PCT Pub. Date: Oct. 28, 2021

(65) Prior Publication Data

US 2023/0151181 A1 May 18, 2023

(30) Foreign Application Priority Data

Apr. 24, 2020 (IT) ........................ 102020000008935

(51) Int. Cl.
*C08J 11/24* (2006.01)
*C08G 63/183* (2006.01)
*C08K 5/053* (2006.01)

(52) U.S. Cl.
CPC ............ *C08J 11/24* (2013.01); *C08G 63/183* (2013.01); *C08K 5/053* (2013.01); *C08J 2367/02* (2013.01)

(58) Field of Classification Search
CPC ........................................................ C08J 11/24
See application file for complete search history.

(56) References Cited

U.S. PATENT DOCUMENTS 5,857,406 A * 1/1999 Scheucher .............. B30B 9/121 100/145
2005/0096482 A1 * 5/2005 Tamada .................. C08J 11/24 560/89
2006/0074136 A1 4/2006 Smith et al.

FOREIGN PATENT DOCUMENTS

CN 1214707 A 4/1999
CN 205340782 U 6/2016
(Continued)

OTHER PUBLICATIONS

Machine-generated English-language translation of JP-2005330444-A.*
(Continued)

*Primary Examiner* — Vu A Nguyen
(74) *Attorney, Agent, or Firm* — Element IP, PLC

(57) ABSTRACT

A process for depolymerizing a polyethylene terephthalate (PET) by glycolysis with ethylene glycol (EG) is described. Also described is a plant for carrying out the process. The PET is first mixed in the solid state with EG at a temperature of 60-120° C. to form a heterogeneous mixture with an EG:PET weight ratio of 0.1-3.0, and is then pressed to squeeze out an aliquot of EG. The compressed mixture is fed to a reactor, where the mixture is heated and kept under mixing at a temperature of 170-270° C., with an EG:PET weight ratio of 0.1-4.0, to glycolize the PET and obtain a glycolyzed product containing bis(2-hydroxyethyl) tereph-
(Continued)

Figure 1:
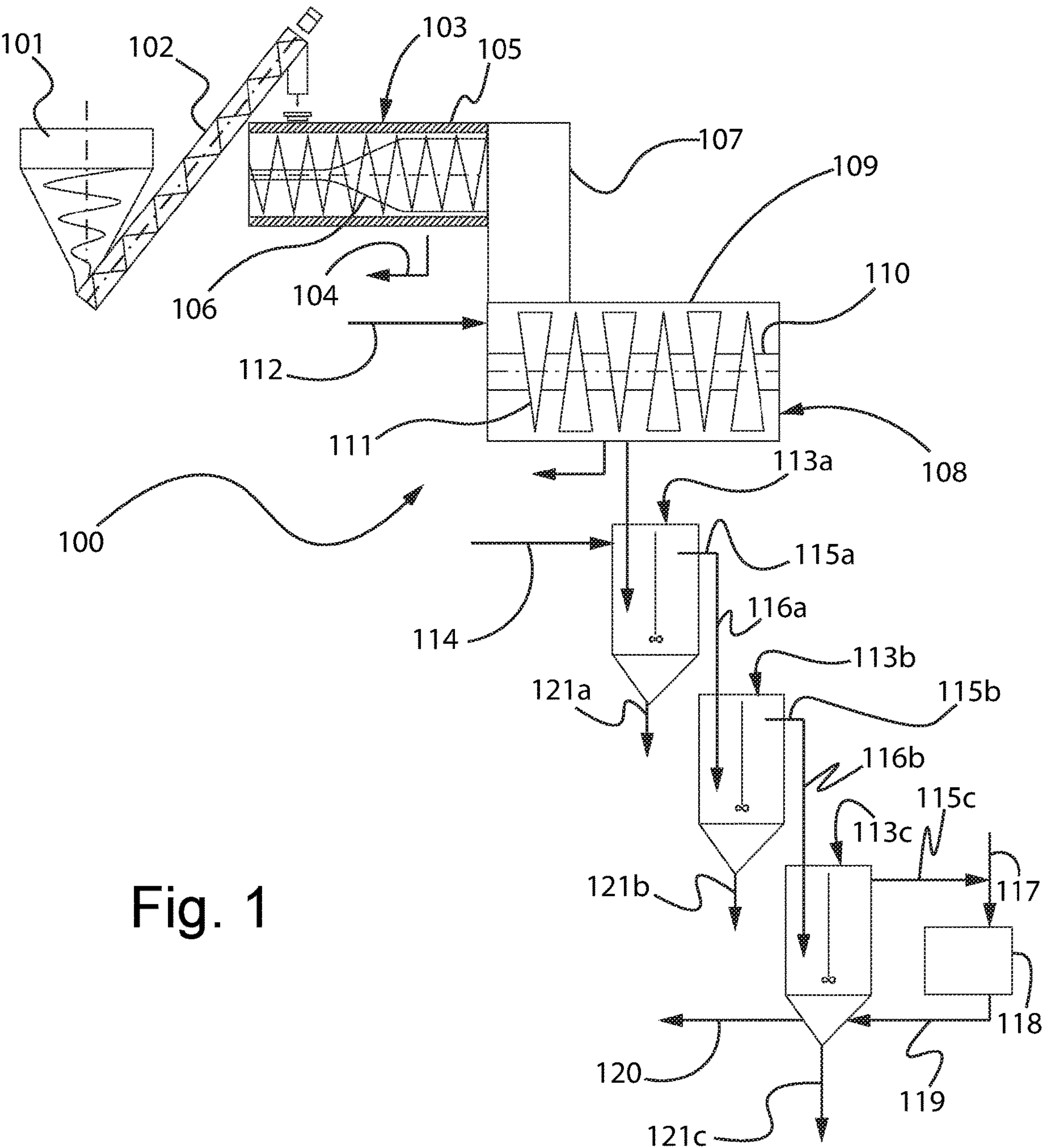

thalate and/or oligomers thereof. The process is advantageous in treating waste PET as such and reducing the EG to PET ratio necessary for glycolysis that allows the reaction to be carried out at relatively high temperatures of 230° C. and above to expedite the process.

19 Claims, 3 Drawing Sheets

(56) References Cited

FOREIGN PATENT DOCUMENTS

| | | | |
|---|---|---|---|
| JP | 2005330444 A | * | 12/2005 |
| RU | 11752 U1 | | 11/1999 |
| WO | WO-2016096768 A1 | | 6/2016 |
| WO | WO-2020061521 | | 3/2020 |

OTHER PUBLICATIONS

Office Action issued May 27, 2025, in corresponding Japanese Patent Application No. 2022-563162 (with English translation), 10 pages.

International Search Report issued Oct. 14, 2021 in PCT/IB2021/053228, 3 pages.

Written Opinion issued Oct. 14, 2021 in PCT/IB2021/053228, 6 pages.

Combined Chinese Office Action and Search Report issued Jun. 7, 2023 in Chinese Patent Application No. 202180030451.8 (with English translation of Categories), 7 pages.

Hu Yuan-chao et al., "Depolymerization of Waste Polyester by Ethylene Glycol and the Analysis of Obtained Products", China Academic Journal Electronic Publishing House, 2018, pp. 1-5 (with English translation).

Office Action issued Dec. 12, 2025, in corresponding European Patent Application No. 21726188.2, 4 pages.

* cited by examiner

PROCESS FOR DEPOLYMERIZING POLYETHYLENE TEREPHTHALATE (PET) BY GLYCOLYSIS WITH ETHYLENE GLYCOL, AND PLANT FOR CARRYING OUT THE SAME

The present invention relates to a process for depolymerizing a polyethylene terephthalate (PET), in particular PET from post-industrial and post-consumer waste, and to a plant for carrying out the same.

Polyethylene terephthalate (PET) is a widely used semi-crystalline thermoplastic polyester with high strength and transparency, which has several applications thanks to its physical and chemical properties, in particular in packaging and fibre production. Global PET production reached a capacity of more than 70 million tonnes (Mton) in 2017, of which around 15 Mton were produced in Europe, for manufacturing synthetic fibres (around 67%), bottles (around 23%) and packaging (10%).

PET poses no safety risk, but increased consumption and accumulation in waste streams and its non-biodegradability raise environmental and economic concerns. Therefore, there is a growing interest in PET recycling technologies.

PET is considered to be a polymeric material that can be easily recycled and its recycling is the most common among polymeric materials. The technologies can be grouped into two macro-categories: mechanical and chemical recycling.

Mechanical recycling consists mainly in obtaining PET flakes, by crushing and grinding previously sorted waste, which are sent directly to extrusion to produce new articles. The main problems with this technology are due to the heterogeneity of solid waste and to the low quality of the final product, as PET deteriorates its mechanical properties consequently to each recycling process.

Chemical recycling involves decomposing polyester using a reagent capable of depolymerising PET chains to obtain the starting monomers; chemical depolymerisation of PET is usually obtained by hydrolysis or methanolysis or glycolysis.

Hydrolysis depolymerises PET into terephthalic acid (TPA) and ethylene glycol (EG) (also called monoethylene glycol—MEG) by reaction with water. Methanolysis degrades PET to dimethyl terephthalate (DMT) and EG by reaction with methanol. Glycolysis causes the depolymerization by reaction with EG to produce bis(2-hydroxyethyl) terephthalate (BHET), an intermediate product formed in the first stage of PET production from the starting monomers (terephthalic acid and EG).

Today, mechanical recycling is still the most widely used technology for the treatment of PET containing waste, although it does not produce a high quality material suitable for food contact. There is therefore a growing interest in chemical recycling technologies as they comply with the principles of sustainable development, providing raw materials for the production of virgin PET, which is of course of much higher quality than mechanically recycled PET.

As regards the PET depolymerisation reaction by glycolysis, this is usually carried out in batch reactors consisting of tanks equipped with a mechanical mixing system with circular helical movement, to which the heat necessary for the reaction is supplied by heat exchange through the walls of the reactor itself. This type of reactor is suitable for treating fluids or even suspensions of solids with fluid-like characteristics. Therefore, waste PET, in order to be processed, has to be reduced, after appropriate selection and cleaning, into small-sized flakes (around 5-10 mm) with a homogeneous particle size by a grinding process, in order to form suspensions with a sufficiently high fluidity to ensure adequate reaction kinetics for industrial production. This implies the use of a high ratio of liquid phase (consisting mainly of EG) to solid phase (consisting of waste PET), typically not less than 5 and usually between 5 and 10. In the case of fabric or film recycling, this ratio can be even higher.

Patent application WO 2016/096768 describes a process for carrying out PET glycolysis which comprises:

(a) a dissolution stage in which PET is mixed with ethylene glycol (EG) in an EG:PET weight ratio from 1 to 50, at a temperature between 100° C. and 300° C.;
(b) a liquid-solid separation stage;
(c) a glycolysis stage of the liquid phase obtained from stage (b) in the presence of a heterogeneous catalyst at a temperature from 100° C. to 300° C. and a pressure from 0.1 to 6 MPa, with a ratio of reactor feed rate to catalyst mass (PPH) between 0.1 and 100 $h^{-1}$.

The Applicant has posed the technical problem of developing a process, and the plant for carrying out the same, for depolymerizing PET, in particular waste PET, by means of glycolysis reaction with ethylene glycol (EG) having the following characteristics:

(i) possibility of processing waste PET as such and thus in an inhomogeneous form, i.e. without the need to reduce it to small-sized and highly homogeneous flakes;
(ii) capability to supply heat with high efficiency to a considerable mass of PET to be depolymerised;
(iii) possibility of reducing the ratio of EG to PET required to carry out the glycolysis, hence the possibility of carrying out the glycolysis at relatively high temperatures (at 230° C. and above) and at relatively low pressure (around or slightly above atmospheric pressure), so as to achieve an increase in the speed of the glycolysis process;
(iv) possibility of carrying out the process both continuously and discontinuously, depending on production requirements.

According to a first aspect, the present invention therefore relates to a process for depolymerizing a polyethylene terephthalate (PET) by glycolysis with ethylene glycol (EG), which comprises:

(a) mixing the PET in the solid state with EG at a temperature from 60° C. to 120° C., preferably from 80° C. to 100° C., and pressing the so obtained heterogeneous mixture to squeeze out an aliquot of EG so as to obtain the heterogeneous mixture with an EG:PET weight ratio (R1) from 0.1 to 3.0, preferably from 0.2 to 0.8;
(b) feeding the aforesaid heterogeneous mixture into a reactor where the mixture is heated and kept under mixing at a temperature from 170° C. to 270° C., preferably from 200° C. to 250° C., with an EG:PET weight ratio (R2) from 0.1 to 4.0, preferably from 0.2 to 2.0, so as to glycolize the PET and obtain a glycolyzed product containing bis(2-hydroxyethyl) terephthalate (BHET) and/or oligomers thereof.

Preferably, in step (a) the PET in the solid state is mixed with an amount of EG such as to initially obtain an EG:PET weight ratio (R0) from 0.2 to 4.0, preferably from 0.5 to 2.0. This ratio is gradually reduced during the pressing step until it reaches the R1 value indicated above.

In a preferred embodiment, step (a) is carried out in a screw press. This is a machine known in the art, which is commonly used to separate a liquid from a solid that is in suspension in the liquid itself, for example in the paper industry for the treatment of cellulose-based suspensions, or in the waste treatment industry, for example to reduce the volume of sludge produced by a wastewater treatment plant.

Preferably, a screw press comprises a container, substantially cylindrical in shape, within which a helical screw is placed and which rotates about its axis defining a transport channel having a decreasing section along the axis of the screw itself. Thus, the solid PET mass mixed with EG is pushed and compressed along the helical screw, so as to squeeze out an aliquot of the added EG. The liquid is usually squeezed out through the container, which has a filtering wall through which the excess EG escapes.

Preferably the container is equipped with a filtering wall consisting of wires placed side by side having a "V" section, commonly called wedge wire screen. These are generally filtering structures consisting of rods, generally with a "V" section, parallel to each other and welded to support elements, with a flat or round section, having a circular or spiral shape, thus forming a cylindrical structure. The rods are spaced apart so as to provide a filtering structure with high mechanical strength, high free area and low clogging propensity. Further information on this type of filtering element can be found on the company's website Costacurta SpA (http://www.costacurta.it/it/prodotti/elementi-filtranti/wedge-wire-screen/).

The screw press usually has a horizontal configuration. However, a screw press with a vertical configuration, in which the material is fed from above and discharged from below, can be used as an alternative. This configuration has a number of advantages, including more uniform filling of the internal space and therefore more homogeneous processing of the material. In addition, the movement of the material inside the press is favoured by the force of gravity with a consequent increase in productivity. Further details on this embodiment can be found for example in the magazine Spectrum—Tech News No. 36/February 2017, pages 57-59 (available at https://www.andritz.com/).

In a preferred embodiment, the screw press is arranged with an inclined configuration, that is, with the axis of development of the screw inclined with respect to the horizontal plane. Preferably, in the inclined configuration, the material is fed into the screw press through a feed opening located at a lower level than the opening for the exit of the material from the press itself. Preferably, the screw press is arranged with the axis of development of the screw inclined at an angle of from 20° to 60°, more preferably from 35° to 55°, with respect to the horizontal plane.

It is believed that the screw press arranged with an inclined configuration as described above is particularly advantageous, as it allows to obtain an optimal hydraulic seal (about 100 mBar) regardless of compressibility and deformability characteristics of the PET being fed. This effect can thus also be obtained with a waste PET which inevitably has an inhomogeneous composition and therefore non-uniform characteristics that vary from batch to batch.

Thanks to the characteristics of the screw press, the waste PET, obtained from post-industrial and post-consumer waste, can be fed as such, or after being subjected to a coarse shredding step, without the need to obtain PET in the form of flakes as conventionally carried out in the recovery processes of waste PET.

During step (a), PET is subjected to a temperature from 60° C. to 120° C., preferably from 80° C. to 100° C., i.e. close to or higher than the glass transition temperature ($T_g$) of PET, and in any case lower than its melting temperature ($T_m$). At these temperatures, PET collapses, losing its characteristics of glassy rigidity, and mixes more intimately with the EG, giving rise to a heterogeneous mixture formed by PET (solid) and EG (liquid), which is then transferred to step (b). Preferably, for safety reasons, the temperature is kept below the flame temperature (flash point) of the EG (which is equal to 115° C.).

According to a preferred embodiment of the process according to the present invention, step (a) is subdivided into two steps (a1) and (a2), carried out in two different devices: step (a1) of mixing the PET in the solid state with EG, at a temperature from 60° C. to 120° C., preferably from 80° C. to 100° C., is carried out in a blender, preferably a continuous blender, equipped with a heating system, to which PET and EG are fed. The blender mixes and heats the two products with the formation of a heterogeneous mixture, thanks to the action of the temperature that causes the polymeric material to collapse and allows an effective mixing with the liquid phase (EG).

An apparatus known in the art, such as an auger or a ribbon blender, can be used as a blender.

As is known, a belt blender comprises a container in which a rotating shaft is placed on which a plurality of arms is fixed which support one or more steel strips arranged helically around the shaft. A particularly efficient embodiment of this machine provides two belts that form two concentric helices, of which the outermost one moves the material being processed in one direction and the innermost one in the opposite direction, thus achieving a particularly efficient mixing even of inhomogeneous materials.

The heterogeneous mixture is conveyed from the blender to the inlet of the screw press, where step (a2) is carried out, i.e. the step of compressing the heterogeneous mixture which allows to squeeze out an aliquot of EG from the mixture itself, so as to reduce the EG content and obtain in the heterogeneous mixture an EG:PET weight ratio (R1) as above indicated.

The execution of step (a) in two different devices as shown above makes it possible to use for the pressing step (a2) a commercial type screw press, which is usually without a heating system.

Preferably, the heterogeneous mixture is transferred from step (a) to step (b) by passing through a transfer cell which collects a predetermined quantity of the heterogeneous mixture exiting from step (a) and transfers the same to step (b) by gravity.

Preferably, step (b) is carried out in an inert atmosphere, for example in a nitrogen atmosphere, in order to avoid oxidative degradation of the polymer caused by the atmospheric oxygen at elevated temperatures. In this case, the transfer cell is a hydraulically sealed cell, so as to maintain an inert atmosphere within the device in which step (b) is carried out.

It is also possible to carry out step (a) in an inert atmosphere similarly to step (b), however this is not strictly necessary as it is believed that the temperatures used for step (a) are such as not to cause significant degradations of the PET being processed.

Preferably, at step (b) additional EG is fed so as to maintain the EG:PET weight ratio (R2) within the indicated range. It is also possible to feed to step (b) BHET and/or the oligomers thereof, which can be recovered during subsequent process steps. The addition of BHET and/or the oligomers thereof allows a further acceleration of the glycolysis reaction thanks to their high reactivity towards PET.

It is important to underline that the hydraulic tightness is also guaranteed by the fact that, at the exit of the screw press, a sort of "stopper" is obtained consisting of the heterogeneous mixture between PET and EG that has been pressed inside the press itself, which, having reached a certain critical mass, falls into the transfer cell and then passes to step (b).

The inert atmosphere can be achieved by replacing air with nitrogen, at a pressure generally between 0.1 and 1.5 atm, preferably between 0.3 atm and 0.7 atm.

In a preferred embodiment, step (b) is carried out in a paddle reactor. This is a machine known in the technique, usually called "paddle dryer", which is commonly used to heat and dry materials of various kinds, including polymeric materials, minerals and metal powders, particularly in the food, chemical and pharmaceutical industries, and also to dry sludge produced by a wastewater treatment plant.

Preferably, the paddle reactor comprises a container within which a pair of shafts rotating around their axis are arranged, on which a plurality of paddles are mounted, which heat and mix the mass of solid PET mixed with the EG so as to depolymerize the polymer by glycolysis and produce bis(2-hydroxyethyl) terephthalate (BHET) and/or oligomers thereof.

The two sets of paddles, having a circular outer edge, are generally interpenetrating each other, so as to increase the mixing action.

The paddles generally have a wedge shape, i.e. a triangular cross-section, so as to ensure the self-cleaning of the paddles themselves, allowing the treatment of inhomogeneous materials with low fluidity, such as waste PET as such, i.e. not reduced into flakes. The bottom of the container in which the pair of rotating shafts is arranged preferably has an omega-shaped cross-section, so as to maintain a substantially constant distance between the edge of the rotating paddles and the bottom, avoiding stagnation of the material being processed and homogeneous mixing of the entire processed mass.

The paddle reactor is preferably equipped with a system for maintaining an inert atmosphere within it, for example by replacement of air with nitrogen as illustrated above.

The heating of the mass inside the reactor can be carried out by means of the shafts and the paddles, which are both hollow and therefore act as heat exchangers through the introduction of a heating fluid inside them, which therefore brings heat directly inside the mass to be treated and allows a faster and more uniform heating compared to a heating from the outside, typical of conventional reactors. If necessary, heating of the material being processed in the paddle reactor can be further provided by an external heating jacket.

There are numerous advantages deriving from the implementation of the process according to the present invention.

First, step (a) allows solid-state PET to be intimately impregnated with EG, without the need to use PET in flake form. Indeed, it should be borne in mind that, depending on its origin, waste PET may contain various foreign materials that are generally eliminated before the glycolysis reaction takes place (e.g. zippers, buttons, glass wool, fabrics, aluminium, polymers other than PET, multilayer materials where PET is coupled with other polymeric and/or metallic layers, etc.). The intimate mixing between PET and EG allows for improved yield and decreased reaction time of the next step (b). In fact, the amount of free EG, i.e. not intimately mixed with PET, is reduced, and this allows increasing the glycolysis temperature while maintaining the pressure around atmospheric pressure, with obvious advantages in terms of reaction speed.

In addition, step (a) allows reducing the water content initially present in PET (which can be around 5-7% by weight in waste PET from post-industrial or post-consumer waste) below a threshold value which is typically set at 0.5% by weight, with respect to the weight of PET. In fact, the water present mixes with the added EG and is largely removed during pressing.

The presence of an excessive amount of water in the subsequent steps can cause various inconveniences. In fact, the latent heat for the passage of state from liquid to vapour of water is high, so an excessive amount of water (usually greater than 0.5% by weight) leads to a high energy consumption by subtracting the heat necessary to carry out the glycolysis reaction. In addition, the presence of water in significant amounts can promote secondary reactions.

For carrying out step (a) of the process, and in particular step (a2), the use of a screw press is particularly advantageous, as it is a particularly robust machine suitable for processing solids, which accepts heterogeneous materials without presenting problems of clogging in the advancing flow. This is a significant advantage over an extruder which is the most commonly used machine for mixing thermoplastic polymeric materials with liquid or solid additives. In fact, an extruder has a low tolerance with respect to the presence of hard and coarse foreign products in the treated material, which would cause frequent interruptions in the processing in order not to damage the extruder screws.

As for step (b), this is particularly effective and efficient, with very high PET glycolysis yields and relatively low reaction times. Typically, the overall yield in BHET and oligomers thereof of the process in accordance with the present invention is greater than 98%, preferably around 100%.

As regards reaction times, they may vary depending on various factors, including the volume of the reaction mass, the exchange surface between PET and EG, the reaction temperature and the characteristics of the paddle reactor. Typically, step (b) may be conducted for a time from 1 to 60 minutes, preferably from 2 to 40 minutes.

The use of a paddle reactor for step (b) allows, on the other hand, to increase the heating rate of the PET mass being processed, thanks to a high heat exchange capacity, which takes place thanks to the heating of the shafts and the paddles that act as heat exchangers, whereby the heat is transferred inside the mass being processed, and not simply by contact with the external wall of the reactor.

Thanks to the design and the configuration of the paddles, which have a wedge-shaped cross-section, the paddle reactor also guarantees a high mixing capacity of the fluid mass both in the longitudinal and in the radial direction. The paddle reactor also allows an advancement by piston (plug flow) of the material, which ensures an effective control over the material advancement rate.

The advancement of the material inside the reactor is mainly due to the weight of the material discharged by the screw press, whose pushing effect can be controlled by adjusting the inclination of the reactor with respect to the horizontal position.

At the end of step (b), a filtration step of the glycolyzed product may possibly be performed, in order to separate possible solid products in suspension, for example fillers present in the starting PET, such as titanium dioxide, which are added to impart particular properties to the material. Such filtration may be carried out by conventional filtering media, to which the glycolyzed product is fed, for example by means of a pump placed at the outlet of the reactor in which step (b) is carried out.

With regard to the machines that can be used to carry out the process according to the present invention, this generally involves machines available on the market for various types of processing, as discussed above. Suitable screw presses and paddle dryers can be found, for example, in the catalogues of the companies Andritz Gouda BV, Huber Technology Inc. and Nara Machinery Co. Ltd.

The process according to the present invention may be carried out in a discontinuous manner (batch-wise), or in a continuous manner. Continuous operation is obviously advantageous from an industrial point of view and is ensured by the sequential use of a screw press for step (a) and of a paddle reactor for step (b), which are both machines that can operate continuously.

The size and other characteristics of the reactor in which step (b) is carried out (in particular the paddle reactor) may be chosen so as to obtain a glycolyzed product having the desired glycolysis ratio.

However, in the event that a glycolyzed product containing a particularly high amount of BHET monomer is to be obtained, it is necessary to perform an enhanced glycolysis. For this purpose, to avoid providing an excessively large machine for carrying out step (b), it is advantageous to subject the glycolyzed product resulting from step (b) to a further glycolysis step (c), with an EG:PET weight ratio (R4) between 0.5 and 10.0, preferably between 1.0 and 5.0.

The further glycolysis step (c) can be carried out in a conventional reactor for liquids, the glycolyzed product being in liquid form and therefore pumpable. The reactor may, for example, be a plug flow reactor or a continuous tubular reactor, which ensure continuous operation. Alternatively, it is possible to use a stirred tank reactor, which operates discontinuously, and is essentially formed by a tank, equipped with inlet and outlet ducts, in which there is a stirrer, typically a propeller stirrer, which keeps the reaction mass moving.

If continuous operation is desired, it is also possible to use a plurality of stirred tank reactors (generally three reactors are sufficient) placed in series to form a multistage reactor operating continuously. In fact, each discontinuous reactor carries out a part of the glycolysis, and through an appropriate sizing of the reactors and an adjustment of the inlet feed flow rate from step (b), it is possible to ensure continuous operation. The latter is carried out by continuously feeding the reactants into the first reactor, which is equipped with a weir from which the reaction mixture flows out and is fed to the second reactor in series, where the reaction continues. The second reactor is also equipped with a weir so as to feed the third reactor, and so on until the desired degree of glycolysis is obtained. This embodiment is illustrated in FIG. 1.

At the end of the glycolysis reaction, the glycolyzed product may be subjected to a step of separating possible solid foreign materials, for example polyolefins (such as polyethylene, polypropylene and the like), which generally have lower density than the glycolyzed product, so they may be removed, for example by siphoning, skimming or suction, from the surface of the glycolyzed product.

For this purpose, in the event that an additional glycolysis step (c) is used as illustrated above, the reactor for liquids, in particular the last one if a plurality of reactors placed in series is used, is equipped with a weir from which low density solid materials are collected, while the glycolyzed product is recovered from the bottom of the reactor itself. Although it is preferable, in the case of several reactors in series, to use the weir present on the last reactor in the series to collect low density solid materials, it is possible to use the weir present on the reactors preceding the last reactor for such collection.

Preferably, the foreign materials thus removed are cooled to a temperature of about 90° C.-130° C., for example by addition of EG, so as to facilitate the subsequent separation of the solid materials, for example by filtration, with recovery of the filtered liquid, which contains BHET and/or oligomers thereof. The filtration of polymeric materials at the temperature at which glycolysis takes place is in fact very difficult, due to the molten or semi-solid state in which these materials are found. The filtered liquid is collected and added to the glycolyzed product recovered from the bottom of the reactor, thus increasing the overall yield of the glycolysis process.

A further recovery of BHET and/or oligomers thereof can be obtained by washing the residual solid material with water and/or EG, again at temperatures such that the polymeric material does not soften or melt, typically between 90° C. and 130° C.

According to another aspect, the present invention relates to a plant for depolymerizing polyethylene terephthalate (PET) by glycolysis with ethylene glycol (EG), which comprises:

- a screw press to which PET and EG are fed so as to form a heterogeneous mixture between PET and EG, said screw press comprising a container, substantially cylindrical in shape, within which a helical screw is placed rotating around its axis, wherein the helical screw defines a transport channel having a section decreasing along the axis of the same screw, the container having a filtering wall through which the excess EG escapes;
- a paddle reactor in which the heterogeneous mixture leaving the screw press is fed, said reactor comprising a container, of substantially cylindrical shape, in which a pair of shafts rotating around their own axis are arranged and each equipped with a plurality of paddles.

Preferably, the screw press is arranged so as to have the helical screw with its axis of development inclined with respect to the horizontal plane. In such a configuration, the screw press preferably comprises a PET feed opening located at a lower level than the opening for the outflow of the heterogeneous mixture from the screw press.

Preferably, in the paddle reactor said pair of shafts and the relative paddles are heated inside to provide heat to the heterogeneous mixture.

Preferably, the paddles present on the rotating shafts are interpenetrating each other.

Preferably, the paddles have a wedge shape.

Preferably, the paddle reactor is provided with a system for maintaining an inert atmosphere within it.

Preferably, the plant in accordance with the present invention further comprises a transfer cell, placed between the screw press and the paddle reactor, which collects a predetermined amount of the heterogeneous mixture leaving the screw press and transfers it to the paddle reactor by gravity. Said transfer cell is preferably hydraulically sealed, so as to maintain an inert atmosphere within the paddle reactor.

In a preferred embodiment, the plant in accordance with the present invention comprises, upstream of the screw press, a blender to which the PET and EG are fed to achieve a premixing of the same and to obtain a heterogeneous mixture which is fed to the screw press.

Preferably, the blender is a continuous blender. Preferably, the blender is an auger or a ribbon blender.

In a preferred embodiment, the plant in accordance with the present invention comprises, downstream of the paddle reactor, at least one reactor for liquids, which is fed by a flow of glycolyzed product leaving the paddle reactor and by EG, in order to complete the PET glycolysis.

Preferably, said reactor for liquids is a continuous reactor, in particular a plug flow reactor or a continuous tubular reactor.

Alternatively, said reactor for liquids is a batch reactor, in particular a stirred tank reactor.

In order to operate continuously, the reactor for liquids may comprise a plurality of stirred tank reactors, preferably three stirred tank reactors, arranged in series to form a continuous multistage reactor.

Preferably, downstream of the reactor for liquids, or of the plurality of reactors arranged in series, a weir is arranged from which any solid, low-density foreign materials are removed. Preferably, a filtering device is present downstream of the weir to separate solid foreign materials from the glycolyzed product.

The glycolysis reaction may optionally be carried out in the presence of a heterogeneous transesterification catalyst, which is fed to the blender where step (b) is carried out.

In case the glycolysis reaction is completed in step (c), it is possible to provide for feeding the reactor with fresh catalyst, in order to maintain an adequate reaction rate.

The catalyst may be selected from, for example: carbonates, fatty acid salts or borates of Na, Mg, Zn, Cd, Mn, Co, Ca or Ba (e.g., zinc borate, zinc acetate, sodium carbonate).

Preferably, the glycolysis reaction of the optional step (c) is carried out at a temperature from 170° C. to 250° C., more preferably from 200° C. to 230° C.

As for PET, this is preferably post-consumer and/or post-industrial waste PET, which can result from a large variety of applications such as:

- transparent and/or coloured PET bottles for water, soft drinks, carbonated beverages, and the like;
- opaque PET articles, where the PET contains fillers such as titanium oxide, carbon black, silicates and other pigments;
- multilayer PET articles, typically for the food industry, in which the PET layers are coupled with layers of gas barrier polymers (e.g. nylon, polyvinyl alcohol (EVOH), polyvinyl acetate (EVA)) or metal sheets (e.g. aluminum sheets) or polyolefin sheets;
- printed PET sheets;
- PET fibres.

The product obtained from the glycolysis reaction is a crude BHET solution, in which BHET is dissolved in EG along with various contaminants that result from the specific composition of PET waste. Typically, the crude BHET solution also contains oligomers of BHET, preferably dimers and/or trimers. Contaminants are ingredients of PET waste or derivatives obtained by glycolysis of such ingredients, such as:

- dyes, usually organic dyes;
- inks;
- adhesives and glues;
- polyolefins, e.g. polyethylene or polypropylene used to produce caps;
- PET-G;
- biodegradable polymers, e.g. PLA;
- gas barrier polymers, e.g. polyamides, polyvinyl alcohol (EVOH), polyvinyl acetate (EVA);
- UV absorbers;
- fillers, e.g. titanium dioxide, carbon black, silica, silicates and other pigments;
- metal sheets and fragments thereof, e.g. aluminium sheets.

The crude glycolyzed product can be purified according to known methods. In particular, the raw glycolyzed product may be subjected to filtration to separate insoluble contaminants, and possibly to treatment for the removal of soluble contaminants, for example by an adsorbent agent.

Figures 2, 2A:
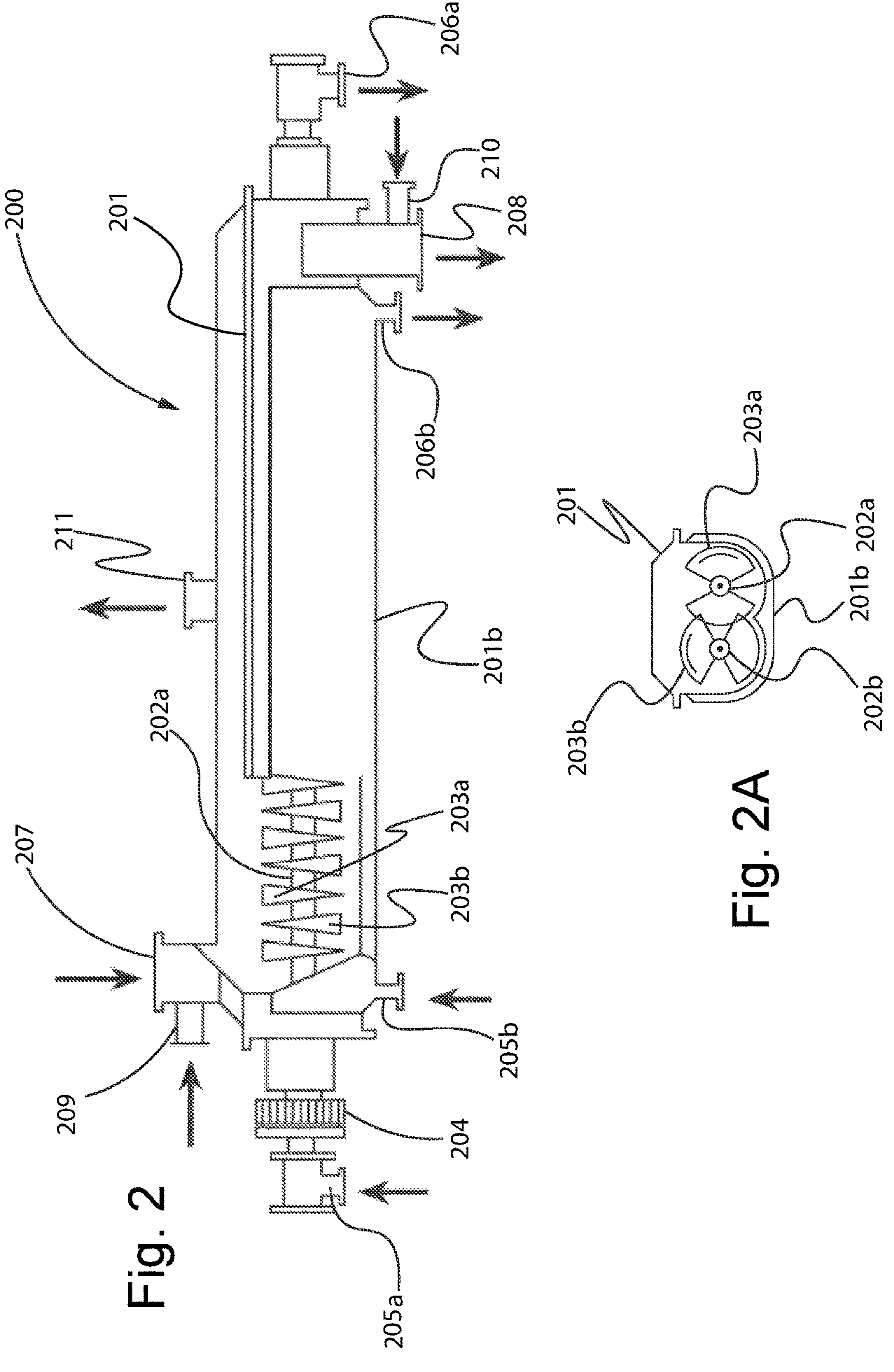
Figure 3:
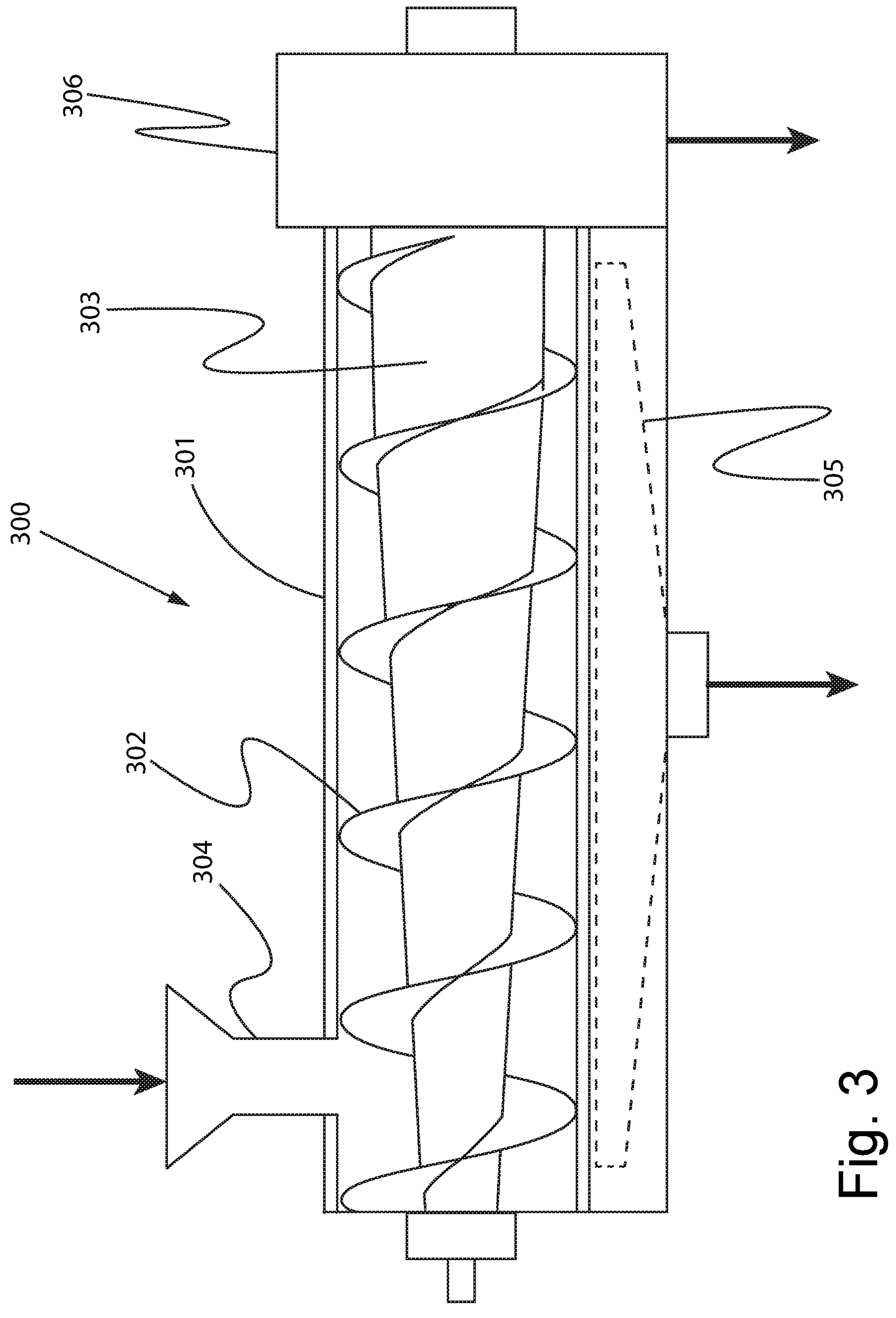

The plant in accordance with the present invention is further illustrated on the basis of the following figures:

FIG. 1: scheme of an embodiment of the plant according to the present invention;

FIG. 2: scheme of a paddle reactor usable in the plant according to the present invention;

FIG. 2*a*: cross-sectional view of the paddle reactor in FIG. 2;

FIG. 3: scheme of a screw press usable in the plant according to the present invention.

FIG. 1 shows a schematic diagram of an embodiment of the plant (100) according to the present invention. The PET to be processed and the EG are fed by conventional means (not shown in the figure) to a belt blender (101). For example, the PET may be fed via a conveyor belt, while the EG may flow within the belt blender (101) via a duct connected to a storage tank. The belt blender (101) is preferably equipped with heating means to bring the mass being processed to the desired temperature. To reach this temperature it is also advisable to feed pre-heated EG to the belt blender (101). A heterogeneous mixture of PET and EG is formed in the blender as shown above.

The heterogeneous mixture is then transported via a screw conveyor (102) and introduced into a screw press (103), where the mixture is further mixed and compressed so as to squeeze out an aliquot of EG. The exiting EG is collected and sent back to the storage tank via a duct (104).

As already shown above, the screw press (103) comprises a cylinder (105) within which a helical screw (106) is placed rotating around its axis, which defines a transport channel having a section that decreases along the axis of the same screw (the representation in FIG. 1 is schematic and is better illustrated in FIG. 3).

At the end of the screw press (103) there is a transfer cell (107), which collects a predetermined quantity of the heterogeneous mixture leaving the screw press (103), which is transferred to the paddle reactor (108) by gravity. The transfer cell (107) is preferably hydraulically sealed, so as to maintain an inert atmosphere in the subsequent processing step in the paddle reactor (108).

As illustrated above, the paddle reactor (108) comprises a container (109), provided with a lid, within which a pair of shafts (110) is arranged rotating about their own axis, on which a plurality of paddles (111) is mounted. Such a device is best illustrated in an embodiment thereof in FIG. 2. EG and possibly BHET and/or oligomers thereof are fed to the paddle reactor (108) via a duct (112). A transesterification catalyst may optionally also be fed to the paddle reactor (108).

The paddle reactor (108) preferably comprises a sealing system (not shown in the figure) that allows an inert atmosphere to be maintained within it, for example by introduction of nitrogen to replace the air present.

The glycolyzed product exiting the paddle reactor (108) is a liquid that can be pumped and used as desired, for example sent to a purification process.

In FIG. 1, the glycolyzed product is transferred to a series of three stirred tank reactors (113*a*, 113*b*, 113*c*), where it is further subjected to glycolysis in order to obtain a high degree of glycolysis. EG can be introduced into the first reactor (113*a*), possibly mixed with the transesterification catalyst, through a duct (114) connected to a storage tank.

The first reactor (113*a*) is equipped with a weir (115*a*) from which the reaction mixture escapes and is fed to the second reactor (113*b*) via a duct (116*a*), where the glycolysis reaction can continue. Similarly to the first reactor (113*a*), the second reactor (113*b*) is equipped with a weir (115*b*) which allows to withdraw the reaction mixture and to convey it, through a duct (116*b*), to the third reactor (113*c*). In the third reactor (113*c*), the glycolysis reaction is completed and the glycolyzed product is extracted from the bottom of the reactor (113*c*) using a duct (120). The reactor (113*c*) is also preferably equipped with a weir (115*c*), which allows the removal of any solid low-density foreign materials (in particular polyolefins) that surface and concentrate on the surface of the liquid glycolyzed product. Such foreign materials are then cooled by addition of EG by means of a duct (117) and introduced into a filtering device (118), which separates the solid from the liquid. The filtered liquid, which contains BHET and/or oligomers thereof, is collected and added via a duct (119) to the glycolyzed product recovered from the bottom of the reactor. The glycolyzed product is sent to subsequent steps (for example to a purification plant) via the duct (120).

Each reactor (113*a*, 113*b*, 113*c*) is equipped with a purge duct (121*a*, 121*b*, 121*c*) to eliminate any high-density foreign products, which collect on the bottom.

FIG. 2 shows a scheme of embodiment of a paddle reactor usable in the plant according to the present invention.

The paddle reactor (200) comprises a container (201) within which a pair of shafts (202*a*, 202*b*) (only one shaft is visible in the figure) are arranged side by side and rotating about their own axis, on each of which a plurality of paddles (203*a*, 203*b*) are mounted. FIG. 2 shows a cross-section of the container (201) only in the initial part for the purpose of showing the presence of the shafts (202*a*, 202*b*) and paddles (203*a*, 203*b*).

The paddles (203*a*, 203*b*) mounted on the two shafts (202*a*, 202*b*) are interpenetrating each other and preferably have a triangular cross-section (i.e. wedge shape), which ensures self-cleaning of the paddles themselves. The shafts (202*a*, 202*b*) are connected to a motor (204) which puts them into rotation. The shafts (202*a*, 202*b*) and the paddles (203*a*, 203*b*), having a hollow structure, are connected to an inlet port (205*a*) of a heating fluid, so as to allow the fluid to enter the shafts and paddles, which are then heated to transfer heat to the material being processed. Furthermore, there may be another inlet port (205*b*) through which a heating fluid is introduced into a heating jacket (201*b*) which encloses the container (201). The exhausted heating fluid is extracted through an outlet port (206*a*) connected to the shafts and an outlet port (206*b*) connected to the heating jacket (201*b*).

The material to be processed is introduced into the container (201) through a feed port (207) and exits from the container (201) through a discharge port (208). It is also possible to feed EG and/or BHET and/or oligomers thereof to the container (201) by means of a further feed port (209).

The paddle reactor (200) is equipped with a system that allows working inside the machine in an inert atmosphere. Such a system may comprise, for example, a nitrogen inlet port (210) and a vent port (211), from which nitrogen and other gases or vapours, which can be recycled to the plant, are recovered.

FIG. 2*a* shows a cross section of the container (201) and the two shafts (202*a*, 202*b*) on which the two sets of paddles (203*a*, 203*b*) are mounted. As can be seen from FIG. 2*a*, the bottom of the container (201) has an omega-shaped cross section, which allows to maintain a substantially constant distance between the edge of the rotating blades (202*a*, 202*b*) and the bottom, avoiding stagnation of the material being processed and homogeneous mixing of the whole treated mass.

FIG. 3 shows a diagram of embodiment of a screw press that can be used in the plant according to the present invention.

The screw press (300) comprises a container (301), of substantially cylindrical shape, in which a helical screw (302) mounted on a shaft (303) connected to a motor which allows it to rotate around its own axis is housed. An inlet duct (304) introduces the material to be processed (i.e. PET and EG) inside the container (301). As illustrated in FIG. 3, the shaft (303) has an increasing cross-section along its development from the feed zone to the discharge zone, so as to gradually reduce the section of the channel conveying the material being processed, which is therefore gradually compressed as it moves pushed by the rotating screw (302). A gradual reduction in the section of the transport channel can also be achieved by gradually reducing the pitch of the helical screw from the feed zone to the discharge zone.

Thus, a portion of the EG is squeezed out from the PET and exits through the perforations in the wall of the container (301). This preferably has a wedge wire screen filtering wall as illustrated above. EG squeezed from the PET being processed is collected by a tray (305) and sent to the storage tank for reuse. The PET mixed with EG thus processed is discharged through a transfer cell (306) that feeds the next step carried out in the paddle reactor.

Further details of the structure and operation of a screw press as illustrated above can be found, for example, in U.S. Pat. No. 5,857,406 or US 2011/0297016.

The invention claimed is:

1. A process for depolymerizing a polyethylene terephthalate (PET) by glycolysis with ethylene glycol (EG), the process comprising:

(a) mixing the PET in a solid state with EG at a temperature of from 60° C. to 120° C. to obtain a heterogeneous mixture (A), and pressing the heterogeneous mixture (A) to squeeze out an aliquot of EG to obtain a heterogeneous mixture (B) with an EG:PET weight ratio R1 of from 0.1 to 3.0; and (b) feeding said heterogeneous mixture (B) into a blender where the heterogeneous mixture (B) is heated and kept under mixing at a temperature of from 170° C. to 270° C., with an EG:PET weight ratio R2 of from 0.1 to 4.0, to glycolize the PET and obtain a glycolyzed product containing bis(2-hydroxyethyl) terephthalate (BHET) and/or oligomers thereof, wherein (b) is carried out in an inert atmosphere.

2. The process according to claim 1, wherein in (a) the PET in the solid state is mixed with an amount of EG to initially obtain an EG:PET weight ratio R0 of from 0.2 to 4.0.

3. The process according to claim 1, wherein (a) is carried out in a screw press.

4. The process according to claim 3, wherein the screw press is arranged in an inclined configuration, so that an axis of development of the screw is inclined with respect to a horizontal plane.

5. The process according to claim 1, wherein (a) comprises:

(a1) mixing the PET in the solid state with EG at the temperature of from 60° C. to 120° C. to obtain the heterogeneous mixture (A); and (a2) compressing the heterogeneous mixture (A) to squeeze out the aliquot of EG from the heterogeneous mixture (A) to obtain the heterogeneous mixture (B) with the EG:PET weight ratio R1 of from 0.1 to 3.0 in a screw press.

6. The process according to claim 1, wherein said feeding (b) is carried out by passing the heterogeneous mixture (B) through a transfer cell which collects a predetermined quantity of the heterogeneous mixture (B) obtained from (a) and transfers the same to the blender by gravity.

7. The process according to claim 1, wherein BHET and/or oligomers thereof are fed to the blender in (b), which are optionally recovered subsequently.

8. The process according to claim 1, wherein (b) is carried out in a paddle reactor.

9. The process according to claim 1, wherein the PET in the solid state is used in (a) as such.

10. The process according to claim 1, wherein the heterogeneous mixture (B) obtained in (a) has a water content equal to or lower than 0.5% by weight, with respect to the PET weight.

11. The process according to claim 1, further comprising: filtering the glycolyzed product obtained from (b).

12. The process according to claim 1, further comprising:

(c) subjecting the glycolyzed product obtained from (b) to a further glycolysis to obtain a glycolyzed product with an EG:PET weight ratio R4 of from 0.5 to 10.0.

13. The process according to claim 12, wherein the further glycolysis (c) is carried out in a reactor for liquids.

14. The process according to claim 12, wherein the further glycolysis (c) is carried out in a plurality of stirred tank reactors arranged in series to form a multistage reactor which operates continuously.

15. The process according to claim 12, wherein the glycolyzed product obtained in (c) is subjected to a treatment of removing possible solid foreign materials having a density lower than the glycolyzed product from the surface of the glycolyzed product.

16. The process according to claim 15, wherein solid foreign materials removed from the surface of the glycolyzed product are cooled to a temperature of about 90° C.-130° C.

17. A process for depolymerizing a polyethylene terephthalate (PET) by glycolysis with ethylene glycol (EG), the process comprising:

(a) mixing the PET in a solid state with EG at a temperature of from 60° C. to 120° C. to obtain a heterogeneous mixture (A), and pressing the heterogeneous mixture (A) to squeeze out an aliquot of EG to obtain a heterogeneous mixture (B) with an EG:PET weight ratio R1 of from 0.1 to 3.0;

(b) feeding said heterogeneous mixture (B) into a blender where the heterogeneous mixture (B) is heated and kept under mixing at a temperature of from 170° C. to 270° C., with an EG:PET weight ratio R2 of from 0.1 to 4.0, to glycolize the PET and obtain a glycolyzed product containing bis(2-hydroxyethyl) terephthalate (BHET) and/or oligomers thereof, and (c) subjecting the glycolyzed product obtained from (b) to a further glycolysis to obtain a glycolyzed product with an EG:PET weight ratio R4 of from 0.5 to 10.0, wherein the further glycolysis (c) is carried out in a plurality of stirred tank reactors arranged in series to form a multistage reactor which operates continuously.

18. The process according to claim 1, wherein the glycolyzed product obtained in (b) is subjected to a treatment of removing possible solid foreign materials having a density lower than the glycolyzed product from the surface of the glycolyzed product.

19. The process according to claim 18, wherein solid foreign materials removed from the surface of the glycolyzed product are cooled to a temperature of about 90° C.-130° C.

* * * * *